United States Patent [19]
Stricklin et al.

[11] Patent Number: 5,444,869
[45] Date of Patent: Aug. 22, 1995

[54] METHOD AND APPARATUS IN A COMMUNICATION DEVICE FOR AUTOMATIC TRANSFER OF CONTROL FROM AN INTERNAL PROCESSOR TO AN EXTERNAL COMPUTER

[75] Inventors: Douglas M. Stricklin, Boynton Beach; William R. VanDyke, Jr., Lighthouse Point; Tony Y. Maroun, Boynton Beach; Gregory L. Cannon, Delray Beach, all of Fla.

[73] Assignee: Motorola, Inc., Schaumburg, Ill.

[21] Appl. No.: 286,589

[22] Filed: Aug. 5, 1994

Related U.S. Application Data

[63] Continuation of Ser. No. 962,754, Oct. 19, 1992, abandoned.

[51] Int. Cl.⁶ .......................... H04B 1/40; H04Q 7/18
[52] U.S. Cl. ........................................ 455/89; 455/88; 455/186.1; 455/343; 340/825.44
[58] Field of Search ................. 455/66, 88, 89, 185.1, 455/186.1, 186.2, 344, 343; 340/825.44, 311.1; 379/57, 58

[56] References Cited

U.S. PATENT DOCUMENTS

| | | | |
|---|---|---|---|
| 4,887,311 | 12/1989 | Garner et al. | 455/186.1 |
| 5,043,721 | 8/1992 | May | 340/825.44 |
| 5,163,161 | 11/1992 | Bowles et al. | 455/186.1 X |

OTHER PUBLICATIONS

PCMCIA (Personal Computer Memory Card International Association, PC Card Standard Release 2.0).

Primary Examiner—Edward F. Urban
Assistant Examiner—Chi H. Pham
Attorney, Agent, or Firm—R. Louis Breeden

[57] ABSTRACT

A method and apparatus for automatically transferring control of a portable radio communication device (101) having an internal processor (108) and a first data port (118) comprise transferring (412, 414) control from the internal processor (108) to an external computer (103), the external computer (103) having a second data port (128). In the portable radio communication device (101) the internal processor (108) detects (406) a signal at the first data port (118), the signal indicating that the external computer (103) is coupled to the portable radio communication device (101) through the first and second data ports (118, 128). In response, the internal processor (108) transfers (412, 414) control of the portable radio communication device (101) from the internal processor (108) to the external computer (103).

16 Claims, 3 Drawing Sheets

METHOD AND APPARATUS IN A COMMUNICATION DEVICE FOR AUTOMATIC TRANSFER OF CONTROL FROM AN INTERNAL PROCESSOR TO AN EXTERNAL COMPUTER

This is a continuation of application Ser. No. 07/962,754 filed on Oct. 19, 1992, now abandoned.

FIELD OF THE INVENTION

This invention relates in general to portable radio communication devices, and more specifically to a method and apparatus for transferring control of such devices from an internal processor to an external computer.

BACKGROUND OF THE INVENTION

Portable radio communication devices having data ports for coupling with external computers are well-known in the art. An example is the NewsStream ™ Advanced Information Receiver manufactured by Motorola, Inc. of Schaumburg, Ill. Some laptop computers are now being built with a standard interconnection interface for coupling with other devices, e.g., the Personal Computer Memory Card International Association (PCMCIA) interface.

A problem with this new technology is that the technology is evolving rapidly, thus causing rapid obsolescence of a portable radio communication device designed with a fixed set of features. Shortly after the portable radio communication device is manufactured, additional desirable features and options usually are developed. Unfortunately, there currently is no way to add the new features and options to portable radio communication devices in the field except to physically replace software storage elements with storage elements containing upgraded software. This procedure is relatively costly for material and labor.

An additional problem is that as new features and custom, application-specific software is developed, the size of the software may exceed a limit that is practical for a portable radio communication device in which battery life is an important consideration.

Thus, what is needed is a way of adding new features and options to a portable radio communication device without having to physically replace software storage elements. Also a way is needed of adding new features and custom application software that will not severely degrade the battery life of the portable radio communication device.

SUMMARY OF THE INVENTION

An aspect of the present invention is a method for conserving battery power in a battery-powered portable radio communication device having an internal processor and a first data port, in response to the portable radio communication device being coupled to an external computer having a second data port. The method comprises in the portable radio communication device the steps of (a) detecting a signal at the first data port, the signal indicating that the external computer is coupled to the portable radio communication device through the first and second data ports, and (b) conserving the battery power in the portable radio communication device by transferring control of the portable radio communication device from the internal processor to the external computer in response to step (a). Step (b) comprises in the portable radio communication device the steps of (c) sending a signal to the external computer comprising a request for transfer of control from the internal processor to the external computer, (d) receiving a response from the external computer comprising a list of functional elements that the external computer is programmed to control, and (e) transferring control of the functional elements listed in step (d). Step (b) further comprises in the external computer the steps of (f) responding to step (c) with the list of functional elements that the external computer is programmed to control, and (g) assuming control of the functional elements listed in step (f).

Another aspect of the present invention is a battery-powered portable radio communication device comprising an antenna for intercepting radio signals comprising address and message information, and a receiver coupled to the antenna for demodulating the intercepted radio signals. The portable radio communication device further comprises a decoder coupled to the receiver for decoding demodulated addresses, and a processor coupled to the receiver and to the decoder for controlling the portable radio communication device. The portable radio communication device also includes a memory coupled to the processor for storing software operating instructions and demodulated messages, and a data port coupled to the processor for communicating with an external computer. In addition, the portable radio communication device includes a first processor element coupled to the processor for detecting a signal at the data port, the signal indicating that the external computer is coupled to the portable radio communication device, and a second processor element coupled to the processor for conserving battery power in the portable radio communication device by transferring control of the portable radio communication device from the processor to the external computer. The second processor element comprises a transfer request element for requesting a transfer of control from the internal processor to the external computer, and a transfer completion element coupled to the transfer request element for transferring control of functional elements listed in a response from the external computer.

Another aspect of the present invention is a battery-powered selective call receiver comprising an antenna for intercepting radio signals comprising address and message information, and a receiver coupled to the antenna for demodulating the intercepted radio signals. The selective call receiver further comprises a decoder coupled to the receiver for decoding demodulated addresses, and a processor coupled to the receiver and to the decoder for controlling the selective call receiver. The selective call receiver also includes a memory coupled to the processor for storing software operating instructions and demodulated messages, and a data port coupled to the processor for communicating with an external computer. In addition, the selective call receiver includes a first processor element coupled to the processor for detecting a signal at the data port, the signal indicating that the external computer is coupled to the selective call receiver, and a second processor element coupled to the processor for conserving battery power of the selective call receiver by transferring control of the selective call receiver from the processor to the external computer. The second processor element comprises a transfer request element for requesting a transfer of control from the internal processor to the external computer, and a transfer completion element coupled to the transfer request element for transferring control of functional elements listed in a response from the external computer.

DESCRIPTION OF THE PREFERRED EMBODIMENT

Figure 1:
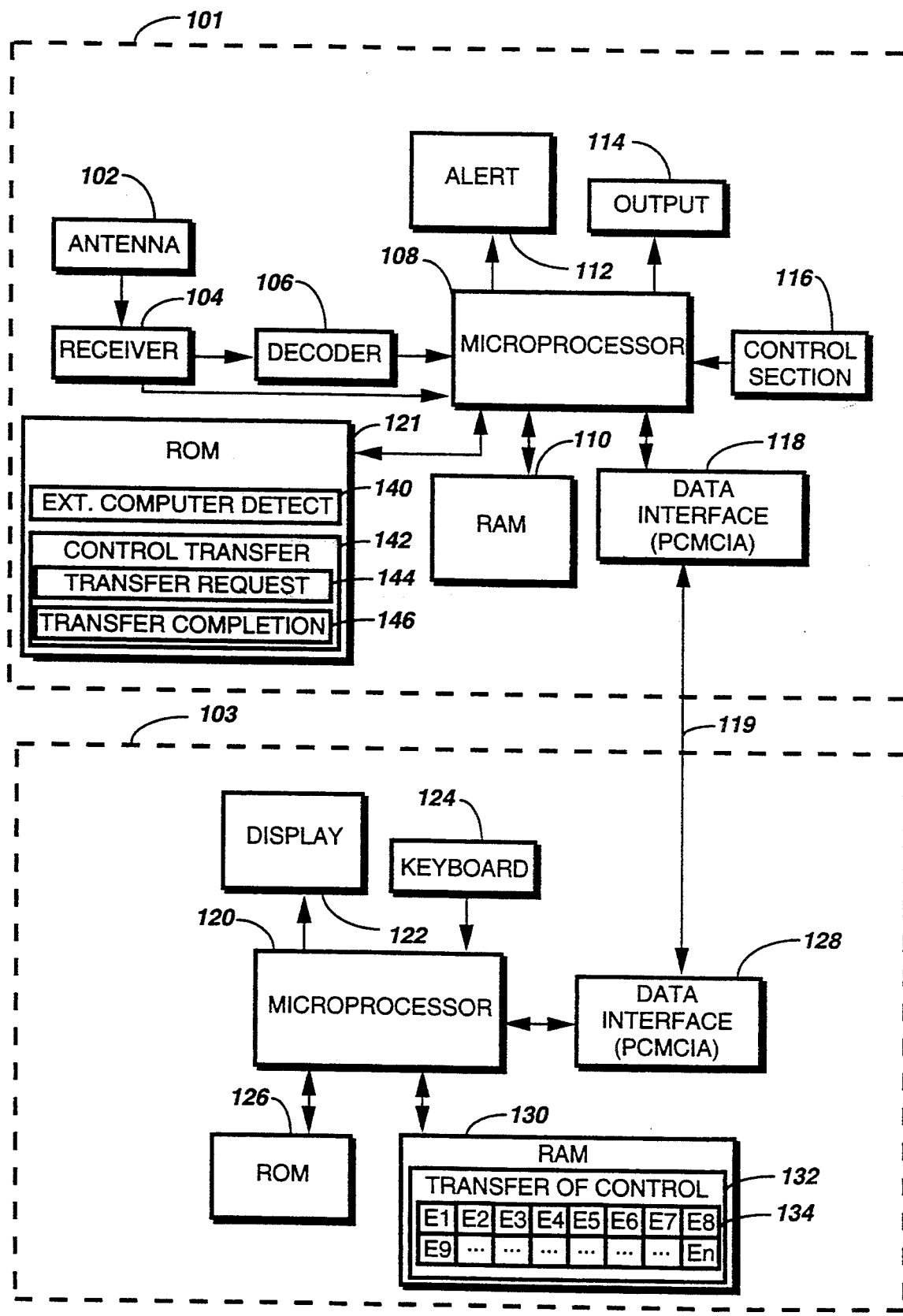
FIG. 1 is an electrical block diagram of a selective call receiver coupled to an external computer in accordance with the preferred embodiment of the present invention.

With reference to FIG. 1, an electrical block diagram of a selective call receiver 101 is shown coupled to an external computer 103 in accordance with the preferred embodiment of the present invention and comprises an antenna 102 for intercepting RF signals. The antenna 102 is coupled to a receiver 104 for receiving and demodulating the RF signals intercepted. A decoder 106 is coupled to the receiver 104 for decoding demodulated address information. A microprocessor 108, e.g., the 68HC05 or C11 manufactured by Motorola, Inc. of Schaumburg, Ill., is also coupled to the receiver 104 for processing the demodulated information to recover messages. The microprocessor 108 is coupled to a random access memory (RAM) 110 for storing the messages recovered, and the microprocessor 108 controls the storing and recalling of the messages. An alert generator 112 is coupled to the microprocessor 108 for providing an audible or tactile alert to a user when the microprocessor 108 has a message ready for presentation.

An output device 114 comprises a visual display or a speaker or both, the output device 114 also being controlled by the microprocessor 108. The control section 116 comprises user accessible controls for allowing the user to command the microprocessor 108 to perform the selective call receiver operations well known to one of ordinary skill in the art and typically includes control switches such as an on/off control button, a function control, etc.

The microprocessor 108 is coupled to a read-only memory (ROM) 121 and a data interface 118 for controlling and communicating with the ROM 121 and the data interface 118, in accordance with the present invention. The ROM 121 comprises two special-purpose elements in accordance with the present invention. An external computer detect element 140 comprises firmware for detecting the presence of an external computer in response to a signal received by the data interface 118. A control transfer element 142 includes a transfer request element 144 containing firmware for requesting transfer of control of the selective call receiver to the external computer. The control transfer element 142 also includes a transfer completion element 146 comprising firmware for transferring to the external computer 103 control of functional elements listed in a response from the external computer 103.

The data interface 118 is constructed and controlled in a manner that meets the well-known Personal Computer Memory Card International Association (PCMCIA) standard interface. The data interface 118 couples with the external computer 103 by a PCMCIA bus 119. One of ordinary skill in the art will recognize that other types of parallel interfaces could be used as well.

The external computer 103, e.g., the HP95LX computer manufactured by Hewlett Packard, Inc. of Palo Alto, Calif., comprises a data interface 128 also of the PCMCIA type coupled to a microprocessor 120 for communicating with the PCMCIA bus 119. The microprocessor 120 is coupled to a display 122, typically an LCD type, and a keyboard 124 for interfacing with a user. A read-only memory (ROM) 126 is coupled to and controlled by the microprocessor 120 for storing software instructions and other pre-programmed information used by the external computer 103. A random access memory (RAM) 130 is also coupled to the microprocessor 120 for storing software programs and other values received from the microprocessor 120. The RAM 130 has been programmed with transfer of control software 132 comprising functional element identifiers 134 identifying functional elements, e.g., address decoding or message handling, that the transfer of control software 132 is able to perform.

Figure 2:
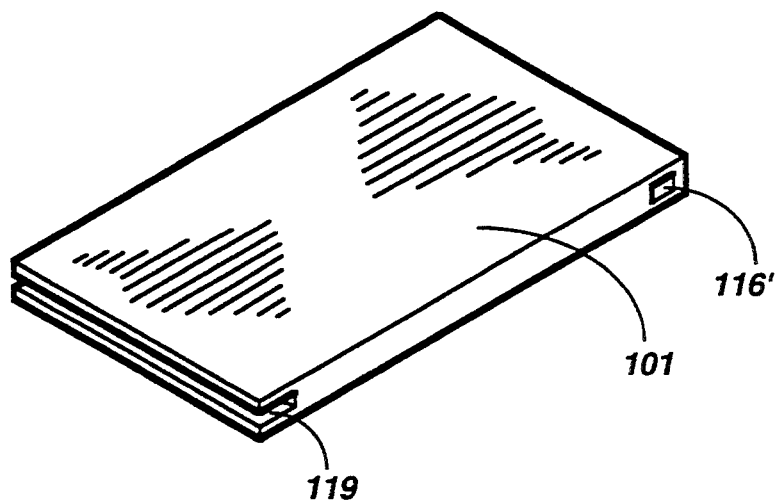
FIG. 2 is an isometric view of the selective call receiver in accordance with the preferred embodiment of the present invention.

With reference to FIG. 2, an isometric view of the selective call receiver 101 in accordance with the preferred embodiment of the present invention depicts a connector comprising the PCMCIA bus 119 for interconnecting with the external computer 103 (FIG. 1). Also depicted is a control button of the control section 116.

Figure 3:
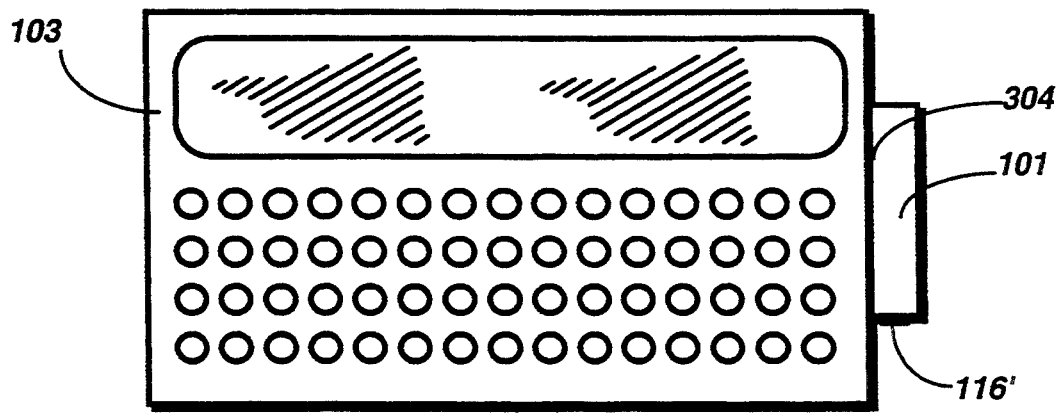
FIG. 3 is an orthographic view of the selective call receiver coupled to the external computer in accordance with the preferred embodiment of the present invention.

With reference to FIG. 3, an orthographic view of the selective call receiver 101 coupled to the external computer 103 in accordance with the preferred embodiment of the present invention depicts the selective call receiver 101 fully inserted into a PCMCIA receptacle 304 of the external computer 103. In this position, the electrical coupling provided by the PCMCIA bus 119 (FIG. 1) allows the external computer 103 to assume some or all the control of the selective call receiver 101 in accordance with the present invention.

Figure 4:
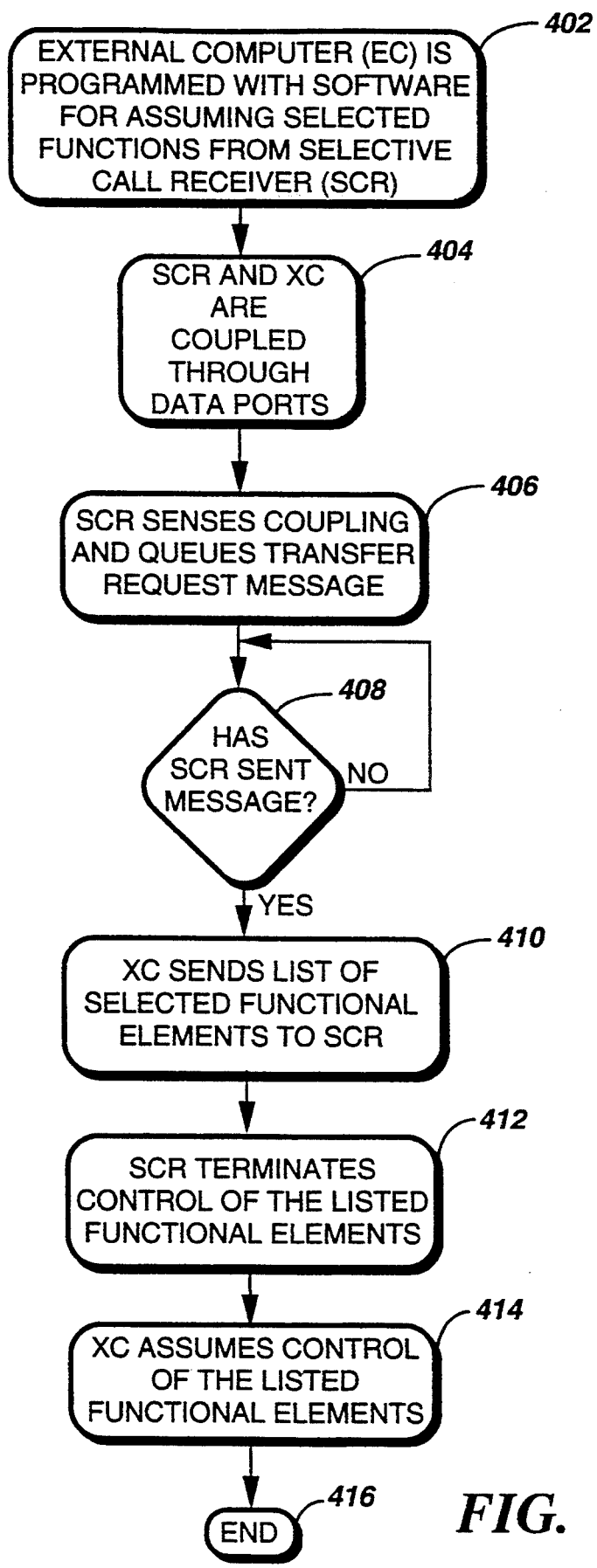
FIG. 4 is a flow chart of the operation of transfer of control from a processor internal to the selective call receiver to the external computer in accordance with the preferred embodiment of the present invention.

With reference to FIG. 4, a flow chart depicts the operation of transfer of control from a processor internal to the selective call receiver 101 (FIG. 1) to the external computer 103 (FIG. 1) in accordance with the preferred embodiment of the present invention. The process begins with the external computer 103 being programmed 402 with software compatible with the transfer of control in accordance with the preferred embodiment of the present invention. A portion of the software includes the functional element identifiers 134 (FIG. 1) that will identify to the microprocessor 108 (FIG. 1) of the selective call receiver 101 those functional elements of the selective call receiver 101 that the software can perform.

Next, the respective data interfaces 118, 128 of the selective call receiver 101 (FIG. 1) and the external computer 103 (FIG. 1) are coupled 404 together. The selective call receiver 101 senses 406 the coupling from a signal, e.g., a voltage level, supplied to the PCMCIA bus 119 (FIG. 1) by the external computer 103 and in response queues a transfer request message to be sent over the PCMCIA bus 119. The microprocessor 120 (FIG. 1) of the external computer waits 408 for the transfer request message, after which the microprocessor 120 sends 410 a list of the functional element identifiers 134 identifying the functional elements of control that the external computer 103 has been programmed to assume from the selective call receiver 101. After receiving the list sent in step 410 the selective call receiver 101 terminates 412 control of the listed functional elements, and the external computer 103 assumes 414 control of the listed functional elements through the PCMCIA bus 119. The process ends thereafter in step 416.

For the case in which one of the functional elements to be transferred to the external computer 103 (FIG. 1) is the processing of certain types of message, e.g., information service or mail drop messages, then message processing will be either transferred or not transferred, based upon message type. For example, a perfectly valid scenario would be to set up the transfer of functional elements such that individual personal messages are processed by the microprocessor 108 of the selective call receiver 101 (FIG. 1), while the typically much longer information service or mail drop messages are processed by the external computer 103.

Thus, the present invention advantageously provides a method and apparatus for adding new features and options to a portable radio communication device without having to physically replace software storage elements of the portable radio communication device. This ability reduces the cost of both material and labor for field upgrades of software. Also a way is provided for adding new features and custom application software that will not severely degrade the battery life of the portable radio communication device. This is so because the present invention allows all software requiring either large amounts of storage or high speed memory to be executed external to the portable radio communication device, thus advantageously removing items associated with high power drain and hence conserving the battery of the portable radio communication device.

I claim:

1. A method for conserving battery power in a battery-powered portable radio communication device having an internal processor and a first data port, in response to the portable radio communication device being coupled to an external computer having a second data port, the method comprising in the portable radio communication device the steps of:
   (a) detecting a signal at the first data port, the signal indicating that the external computer is coupled to the portable radio communication device through the first and second data ports; and
   (b) conserving the battery power in the portable radio communication device by transferring control of the portable radio communication device from the internal processor to the external computer in response to step (a), comprising:
   in the portable radio communication device the steps of:
   (c) sending a signal to the external computer comprising a request for transfer of control from the internal processor to the external computer;
   (d) receiving a response from the external computer comprising a list of functional elements that the external computer is programmed to control; and
   (e) transferring control of the functional elements listed in step (d); and
   in the external computer the steps of:
   (f) responding to step (c) with the list of functional elements that the external computer is programmed to control; and
   (g) assuming control of the functional elements listed in step (f).

2. The method in accordance with claim 1, wherein step (b) comprises transferring total control of the portable radio communication device from the internal processor to the external computer.

3. The method in accordance with claim 1, wherein step (b) comprises transferring partial control of the portable radio communication device from the internal processor to the external computer.

4. The method in accordance with claim 1, further comprising in the external computer the steps of:
   (h) receiving software compatible with the method for automatically transferring control; and
   (i) storing the software received in step (h) in the external computer.

5. The method in accordance with claim 1, further comprising in the portable radio communication device the step of:
   (j) programming the internal processor with software compatible with the method for automatically transferring control.

6. The method in accordance with claim 1, wherein step (b) comprises the step of:
   (k) transferring radio communication message decoding from the internal processor to the external computer.

7. The method in accordance with claim 6, wherein step (k) comprises the step of:
   (l) transferring radio communication message decoding for selected messages.

8. The method in accordance with claim 7, wherein message selection is based upon message type.

9. A battery-powered portable radio communication device comprising:
   antenna means for intercepting radio signals comprising address and message information;
   receiver means coupled to the antenna means for demodulating the intercepted radio signals;
   decoder means coupled to the receiver means for decoding demodulated addresses;
   processor means coupled to the receiver means and to the decoder means for controlling the portable radio communication device;
   memory means coupled to the processor means for storing software operating instructions and demodulated messages;
   data port means coupled to the processor means for communicating with an external computer;
   a first processor element coupled to the processor means for detecting a signal at the data port means, the signal indicating that the external computer is coupled to the portable radio communication device; and
   a second processor element coupled to the processor means for conserving battery power in the portable radio communication device by transferring control of the portable radio communication device from the processor means to the external computer, the second processor element comprising:
   a transfer request element for requesting a transfer of control from the internal processor to the external computer; and
   a transfer completion element coupled to the transfer request element for transferring control of functional elements listed in a response from the external computer.

10. The portable radio communication device of claim 9, wherein the data port means is constructed and operated in accordance with the Personal Computer Memory Card International Association (PCMCIA) standard.

11. The portable radio communication device of claim 9, wherein the second processor element comprises software instructions for transferring total control of the portable radio communication device from the processor means to the external computer.

12. The portable radio communication device of claim 9, wherein the second processor element comprises software instructions for transferring partial control of the portable radio communication device from the processor means to the external computer.

13. A battery-powered selective call receiver comprising:
   an antenna for intercepting radio signals comprising address and message information;
   a receiver coupled to the antenna for demodulating the intercepted radio signals;
   a decoder coupled to the receiver for decoding demodulated addresses;
   a processor coupled to the receiver and to the decoder for controlling the selective call receiver;
   a memory coupled to the processor for storing software operating instructions and demodulated messages;
   a data port coupled to the processor for communicating with an external computer;
   a first processor element coupled to the processor for detecting a signal at the data port, the signal indicating that the external computer is coupled to the selective call receiver; and
   a second processor element coupled to the processor for conserving battery power of the selective call receiver by transferring control of the selective call receiver from the processor to the external computer, the second processor element comprising:
      a transfer request element for requesting a transfer of control from the internal processor to the external computer; and
      a transfer completion element coupled to the transfer request element for transferring control of functional elements listed in a response from the external computer.

14. The selective call receiver of claim 13, wherein the data port is constructed and operated in accordance with the Personal Computer Memory Card International Association (PCMCIA) standard.

15. The selective call receiver of claim 13, wherein the second processor element comprises software instructions for transferring total control of the selective call receiver from the processor to the external computer.

16. The selective call receiver of claim 13, wherein the second processor element comprises software instructions for transferring partial control of the selective call receiver from the processor to the external computer.

* * * * *